United States Patent [19]
Kitade et al.

[11] Patent Number: 6,134,262
[45] Date of Patent: Oct. 17, 2000

[54] SPREAD SPECTRUM RECEIVING APPARATUS

[75] Inventors: Takashi Kitade, Tokyo; Kazuyuki Miya, Kawasaki, both of Japan

[73] Assignee: Matsushita Electric Industrial Co., Ltd., Osaka, Japan

[21] Appl. No.: 08/903,169

[22] Filed: Jul. 30, 1997

[30] Foreign Application Priority Data

Jul. 30, 1996 [JP] Japan ..................... 8-215928

[51] Int. Cl.$^7$ ................................. H04B 15/00
[52] U.S. Cl. ................... 375/142; 375/147; 375/150; 375/267; 701/213
[58] Field of Search .................. 375/200, 222, 375/267, 142, 147, 150; 370/342; 701/213

[56] References Cited

U.S. PATENT DOCUMENTS

| | | | |
|---|---|---|---|
| 5,544,155 | 8/1996 | Lucas et al. | 370/342 |
| 5,559,789 | 9/1996 | Nakano et al. | 370/342 |
| 5,796,776 | 8/1998 | Lomp et al. | 375/140 |
| 5,859,874 | 1/1999 | Wiedeman et al. | 375/267 |

FOREIGN PATENT DOCUMENTS 7-231285   8/1995   Japan .
8-8780     1/1996   Japan .

*Primary Examiner*—Stephen Chin
*Assistant Examiner*—Shuwang Liu
*Attorney, Agent, or Firm*—Lowe Hauptman Gopstein Gilman & Berner

[57] ABSTRACT

A receiving apparatus is disclosed which comprises: a receiving circuit for receiving a radio wave signal including a pilot signal and data signal respectively spectrum-spread and converting the received radio wave signal in a base band signal; a Doppler frequency prediction portion for predicting a Doppler frequency due to a fading; a correlation detector including pilot signal PN code generation circuit for detecting a correlation between the pilot signal in the base band signal and a pilot signal PN code from the pilot signal PN code generation circuit every data length of the pilot signal; a correlation length changing portion for outputting a portion of the detected correlation with a length of the portion of the detected correlation varied in accordance with the Doppler frequency from the Doppler frequency prediction portion; and a demodulator for demodulating the base band signal to detect and output the data signal with a distortion of the data signal due to the fading compensated in accordance with the portion of the detected correlation. The length of the portion of the detected correlation is varied by a switch circuit or a weighting circuit.

8 Claims, 5 Drawing Sheets

SPREAD SPECTRUM RECEIVING APPARATUS

BACKGROUND OF THE INVENTION

1. Field of the Invention

This invention relates to a spread spectrum receiving apparatus for receiving a radio wave signal including spread spectrum data and a pilot signal.

2. Description of the Prior Art

A spread spectrum receiving apparatus for receiving a radio wave signal including spread spectrum data and a pilot signal is known. In the CDMA method of cellular telephone system (IS-95) standardized in the north American area, a pilot signal which is not modulated by data is transmitted from a base station to a mobile station with the pilot signal multiplexed with a data signal. The mobile station uses the received pilot signal for compensating a distortion due to fading. Moreover, a correlation device for spread spectrum communication with an effect due to fading reduced is disclosed in Japanese patent application provisional publication No. 8-8780.

SUMMARY OF THE INVENTION

The aim of the present invention is to provide an improved spread spectrum receiving apparatus.

According to the present invention, a first receiving apparatus is provided, which comprises: a receiving circuit for receiving a radio wave signal including a pilot signal and a data signal respectively spectrum-spread and converting the received radio wave signal into a base band signal; a Doppler frequency prediction portion for predicting a Doppler frequency due to a fading; a correlation detector for detecting a correlation with respect to the pilot signal in the base band signal every data length of the pilot signal; a correlation length changing portion for outputting a portion of the detected correlation with a length of the portion of the detected correlation varied in accordance with the Doppler frequency from the Doppler frequency prediction portion; and a demodulator for demodulating the base band signal to detect and output the data signal with a distortion of the data signal due to the fading compensated in accordance with the portion of the detected correlation.

According to the present invention, a second receiving apparatus is provided which comprises: a receiving circuit including an antenna for receiving a radio wave signal including a pilot signal and data signal respectively spectrum-spread and converting the received radio wave signal into a base band signal; a Doppler frequency prediction portion for predicting a Doppler frequency due to a fading from the base band signal; a correlation detection portion for detecting a correlation with respect to the pilot signal in the base band signal every data length of the pilot signal; a filter circuit for filtering the detected correlation by weighting the detected correlation in accordance with the Doppler frequency from the Doppler frequency prediction portion; and a demodulator for demodulating the base band signal to detect and output the data signal with a distortion of the data signal due to the fading compensated in accordance with the weighted correlation.

According to the present invention, a third receiving apparatus is provided, which comprises: a receiving circuit including an antenna for receiving a radio wave signal including a pilot signal and a data signal respectively spectrum-spread and converting the received radio wave signal into a base band signal; a Doppler frequency prediction portion for predicting a Doppler frequency due to fading to the radio wave signal from the base band signal; a first correlation detection portion including a pilot signal PN code generation portion for detecting a correlation between the pilot signal in the base band signal and a pilot signal PN code from the pilot signal PN code generation portion every data length of the pilot signal; a correlation length changing portion for outputting a portion of the detected correlation with a length of the portion of the detected correlation varied in accordance with the Doppler frequency from the Doppler frequency prediction portion; a second correlation detection portion including PN code generator for detecting a correlation between PN code included in the data signal and a PN code from the PN code generator; a fading compensation portion for compensating an output of the second correlation detection portion in accordance with an output of the correlation length changing portion; and a detection portion for detecting and outputting the data signal from an output of the fading compensation portion.

According to the present invention, a fourth receiving apparatus is provided, which comprises: a receiving portion including an antenna for receiving a radio wave signal including a pilot signal and a data signal respectively spectrum-spread and converting the received radio wave signal into a base band signal; a Doppler frequency prediction portion for predicting a Doppler frequency due to fading from the base band signal; a first correlation detector including pilot signal PN code generation portion for detecting a correlation between the pilot signal in the base band signal and a pilot signal PN code from the pilot signal PN code generation portion every data length of the pilot signal; a filtering circuit for filtering the detected correlation by weighting the detected correlation in accordance with the Doppler frequency from the Doppler frequency prediction portion; a second correlation detection portion including PN code generator for detecting a correlation between a PN code included in the data signal in the base band signal and a PN code from the PN code generator; a fading compensation portion for compensating an output of the second correlation detection portion in accordance with an the weighted correlation; and a detection portion for detecting and outputting the data from an output of the fading compensation portion.

In the first and third receiving apparatus, the length of the portion of the detected correlation is relatively short when the Doppler frequency from the Doppler frequency prediction portion is high. On the other hand, the length of the portion of the detected correlation is relatively long when the Doppler frequency from the Doppler frequency prediction portion is low.

In the second and fourth receiving apparatus, the detected correlation is weighted in accordance with the Doppler frequency from the Doppler frequency prediction portion such that a length of the portion of the detected correlation is made relatively when the Doppler frequency from the Doppler frequency prediction portion is high. On the other hand, when the Doppler frequency from the Doppler frequency prediction portion is low, the detected correlation is weighted in accordance with the Doppler frequency from the Doppler frequency prediction portion such that a length of the portion of the detected correlation is made relatively long.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

<First Embodiment>

Figure 1:
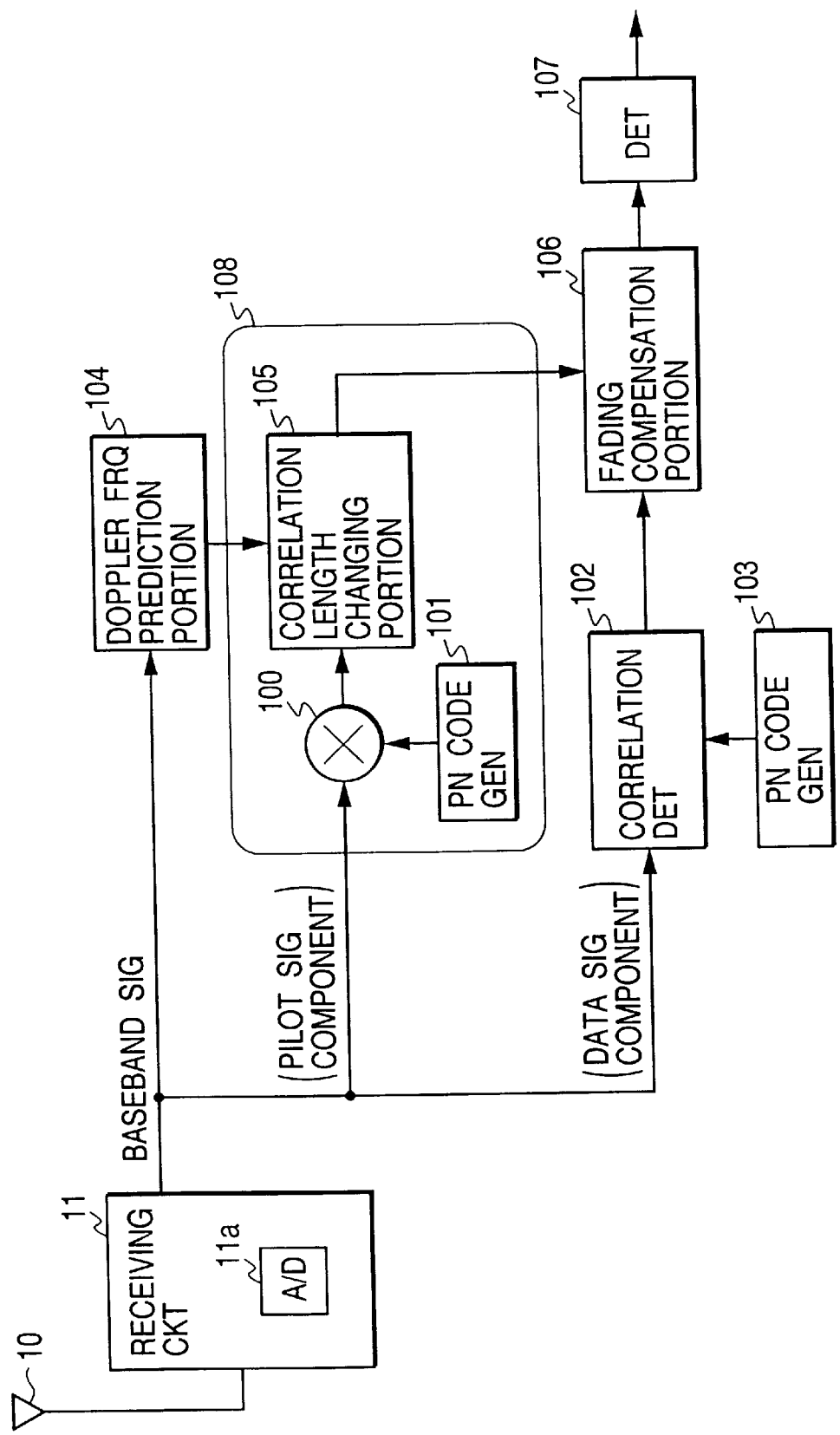
FIG. 1 is a block diagram of a spread spectrum receiving apparatus of a first embodiment.

FIG. 1 is a block diagram of a spread spectrum receiving apparatus of a first embodiment.

The spread spectrum receiving apparatus of the first embodiment comprises a receiving circuit 11 including an antenna 10 and an a/d converter 11a for receiving a spread spectrum radio wave signal including spread spectrum data and a spread spectrum pilot signal and for converting the received spread spectrum radio wave signal into a base band signal sampled by the a/d converter 11a, a Doppler frequency prediction portion 104 for predicting a Doppler frequency from the received pilot signal, a correlation detector 108 for providing a partial correlation result between the received pilot signal and generated PN code-for the pilot signal with a varied length of data of the correlation result to be detected, a PN code generator 103 for generating a PN code independently assigned to the receiving apparatus for the CDMA communication, a correlation detector 102 for detecting a correlation between the base band signal, particularly, the component of the data signal, a fading compensation portion 106 for compensating the detected correlation of the data signal from the correlation detector 102 in accordance with the partial correlation result from the correlation detector 108, and a detector 107 for detecting the received data from an output of the fading compensation portion 106 and outputting the received data.

The correlation detector 108 comprises a PN code generator 101 for generating a PN code for the pilot signal, a multiplier 100 for multiplying the base band signal by the PN code signal from the PN code generator 101, particularly, a component of the pilot signal to output a correlation result of the pilot signal, and a correlation length changing portion 105 for changing a length of data of the correlation result to be detected to provide a partial correlation result of the pilot signal, in accordance with a predicted Doppler frequency.

Figure 2:
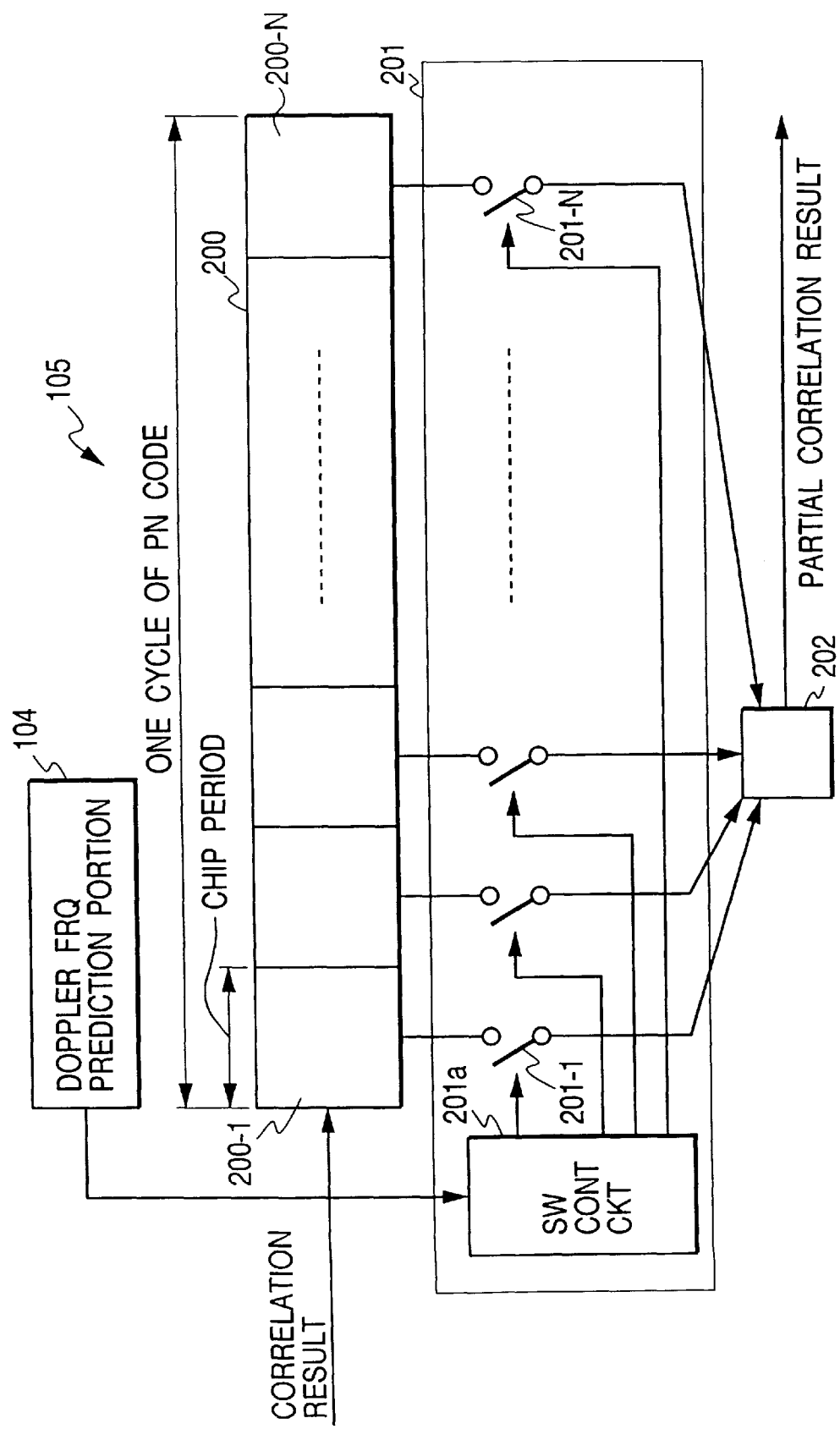
FIG. 2 is a block diagram of a correlation detector and a Doppler frequency prediction portion shown in FIG. 1.

FIG. 2 is a block diagram of the correlation length changing portion 105 and the Doppler frequency prediction portion shown in FIG. 1.

The correlation length changing portion 105 comprises a buffer 200 for storing the correlation result from the multiplier 100 every chip period by a data length of one cycle of the PN code for the pilot signal, a switch circuit 201 including a switch control circuit 201a and switches 201-1 to 201-N for selectively outputting respective data portions of the correlation result stored in the buffer 200 in accordance with the predicted Doppler frequency from the Doppler frequency prediction portion 104, and an adder 202 for adding outputs of the switches 201-1 to 201-N and outputting a combined partial correlation result.

Figure 5:
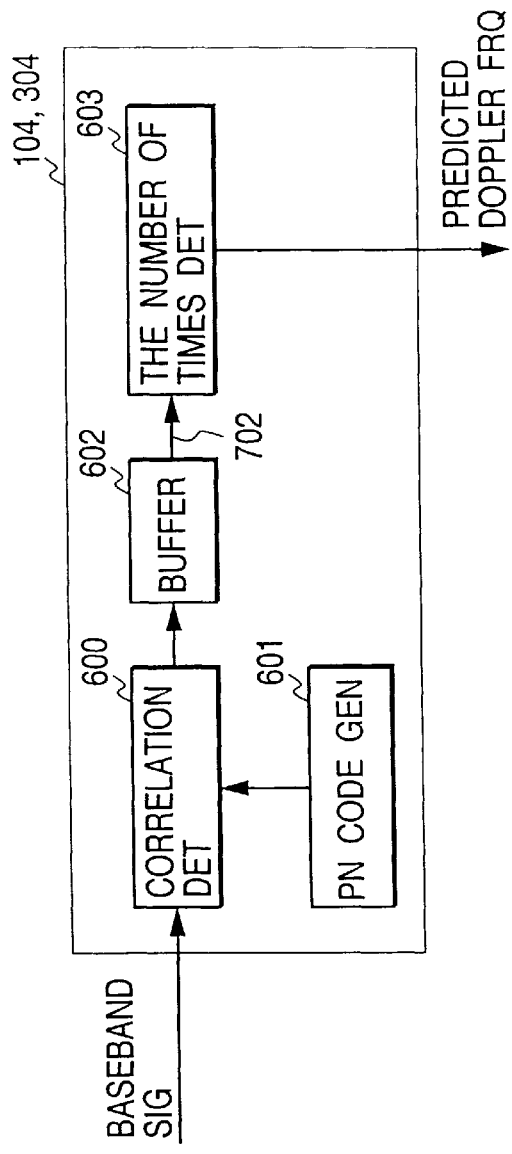
FIG. 5 is a block diagram of Doppler frequency prediction portions of this invention shown in FIGS. 1 and 3.
Figure 6:
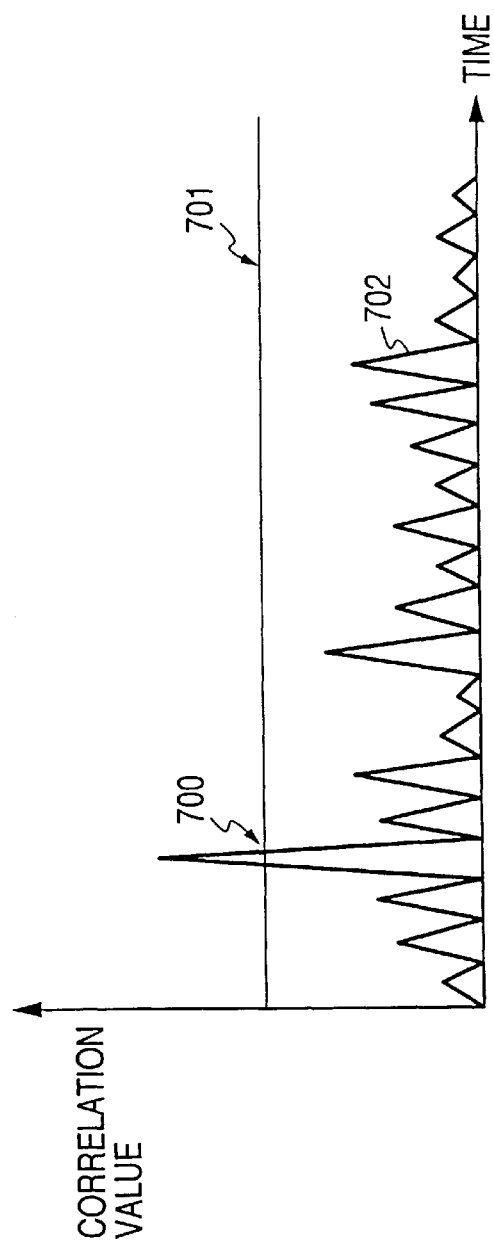
FIG. 6 is a graphical drawing for illustrating an operation of the Doppler frequency prediction portion in FIG. 5.

FIG. 5 is a block diagram of the Doppler frequency prediction portion 104 of this invention shown in FIG. 1 which is also used in a second embodiment mentioned later. FIG. 6 is a graphical drawing for illustrating an operation of the Doppler frequency prediction portion shown in FIG. 5.

The Doppler frequency prediction portion 104 comprises a PN code generator 601 for generating a PN code for the pilot signal, a correlation detector 600 for detecting a correlation between the PN code from the PN code generator 601 and the component of the pilot signal in the base band signal, a buffer 602, and a number of times detector 603 for detecting the number of times that a variation of the correlation value crosses a center value of an electric power of the received spread spectrum radio wave signal for a predetermined interval and outputting the number of times as the predicted Doppler frequency. The buffer 602 provides a buffering operation between the correlation detector 600 and the number of times detector 603.

An operation of the first embodiment will be described.

The receiving circuit 11 receives the spread spectrum radio wave signal through the antenna 10 and converts the received spread spectrum radio wave signal into a base band signal sampled by the a/d converter 11a. The Doppler frequency prediction portion 104 predicts the Doppler frequency from the received pilot signal. However, it is also possible to predict the Doppler frequency from the data signal.

The correlation detector 108 provides the partial correlation operation with a varied length of data of the correlation result to be detected. That is, the PN code generator 101 generates the PN code for the pilot signal in phase with the pilot signal. The multiplier 100 multiplies the base band signal by the generated PN code for the pilot signal, particularly, the component of the pilot signal to output the correlation result of the pilot signal every chip period. The correlation length changing portion 105 outputs the partial correlation result of the pilot signal, as phase information, wherein the length of data of a portion of the correlation result to be outputted changed in accordance with the predicted Doppler frequency.

On the other hand, the correlation detector 102 detects the correlation between the base band signal, particularly, the component of the data signal and the PN code, assigned to the spread spectrum radio wave signal receiver, in the base band signal using the PN code from the PN code generator 103 with the phase of the PN code controlled. That is, the spread spectrum modulated radio wave signal is inverse-spectrum-spread by the PN code from the PN code generator 103. The fading compensation portion 106 compensates the detected correlation from the correlation detector 102 in accordance with the phase information from the correlation detector 108. That is, a distortion due to phase variation in the data signal by fading is compensated in accordance with the phase information in the fading compensation portion 106. The detector 107 detects the received data from an output of the fading compensation portion 106 and outputs the received data.

The buffer 200 receives and stores the correlation result from the multiplier 100 every chip period by a data length of one cycle of the PN code for the pilot signal. The switch circuit 201 selectively outputs respective data portions 200-1 to 200-N of the correlation result stored in the buffer 200 in accordance with the predicted Doppler frequency from the Doppler frequency prediction portion 104. That is, switches 201-a to 201-N included in the switch circuit 201 are respectively controlled by the switching control circuit 201a such that the data length of a portion of the correlation result is controlled in accordance with the detected Doppler frequency.

When a variation in fading is rapid, that is, the Doppler frequency is high, the length of the portion of the correlation result to be outputted is shortened to provide the phase information of the fading such that averaging the phase variation, which would occur when the whole of the correlation result, is outputted. On the other hand, when the variation in fading is slow, that is, the Doppler frequency is low, the length of the portion of the correlation result to be outputted is elongated to provide the phase information of the fading such that a noise in the phase variation, which would generate when a short portion of the correlation result, is outputted.

The PN code generator 601 of the Doppler frequency prediction portion 104 generates the PN code for the pilot signal in phase with the pilot signal in the received radio wave signal. The correlation detector 600 detects the correlation between the PN code from the PN code generator 601 and the component of the pilot signal in the received signal. The buffer 602 provides the buffering operation between the correlation detector 600 and the number of times detector 603 by cyclicly storing correlation values from the correlation detector 600. As shown in FIG. 6, the number of times detector 603 detects the number of times 700 that the variation 702 of the correlation value crosses the center level 701 of an electric power of the received signal as a threshold level for the predetermined interval and outputs the number of times as the predicted Doppler frequency. The Doppler frequency may be predicted in other ways. For example, the Doppler frequency can be predicted by a speed of a vehicle and the frequency of the received radio wave signal if this apparatus is mounted on the vehicle.

<Second Embodiment>

Figure 3:
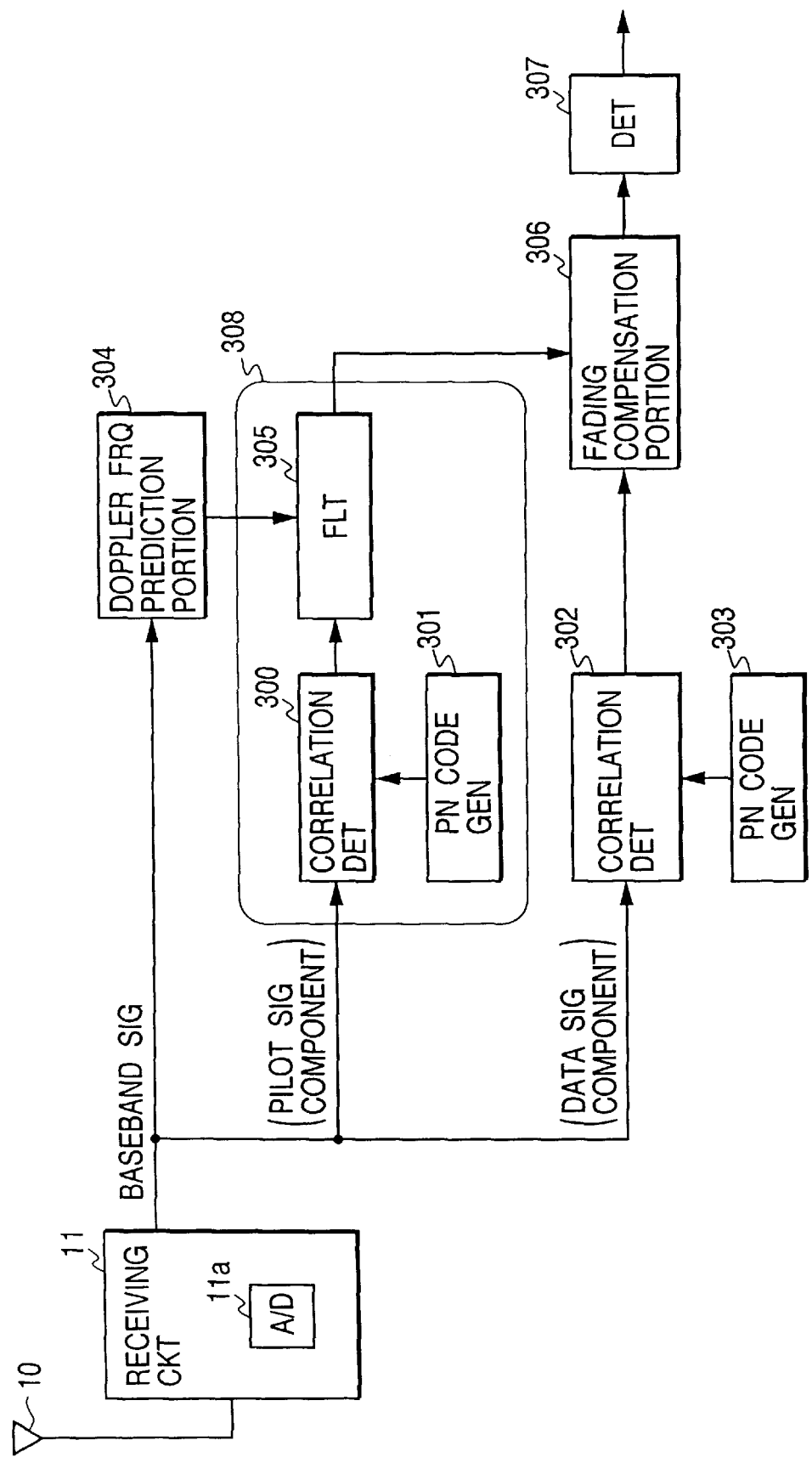
FIG. 3 is a block diagram of a spread spectrum receiving apparatus of a second embodiment.

FIG. 3 is a block diagram of a spread spectrum receiving apparatus of a second embodiment.

The spread spectrum receiving apparatus of the second embodiment comprises a receiving circuit 11 including an antenna 10 and an a/d converter 11a for receiving a spread spectrum radio wave signal including spread spectrum data and a spread spectrum pilot signal and for converting the received spread spectrum radio wave signal into a base band signal, a Doppler frequency prediction portion 304 for predicting a Doppler frequency from the base band signal, a correlation detector 308 for providing a partial correlation result with a varied length of data of the correlation result varied, a PN code generator 303 for generating a PN code independently assigned to the receiver, a correlation detector 302 for detecting a correlation between the base band signal, particularly, the component of the data signal and the PN code for the data signal, a fading compensation portion 306 for compensating the detected correlation from the correlation detector 302 in accordance with the partial correlation result from the correlation detector 308, and a detector 307 for detecting the received data from an output of the fading compensation portion 306 and outputting the received data.

The correlation detector 308 comprises a PN code generator 301 for generating a PN code for the pilot signal, a multiplier 300 as correlation detector for detecting a correlation between the pilot signal component in the base band signal and the PN code signal for the pilot signal from the PN code generator 301, and a filter circuit 305 for filtering a correlation result from the correlation detector 300 with a length of data of the correlation result changed by a weighting operation in accordance with the predicted Doppler frequency.

Figure 4:
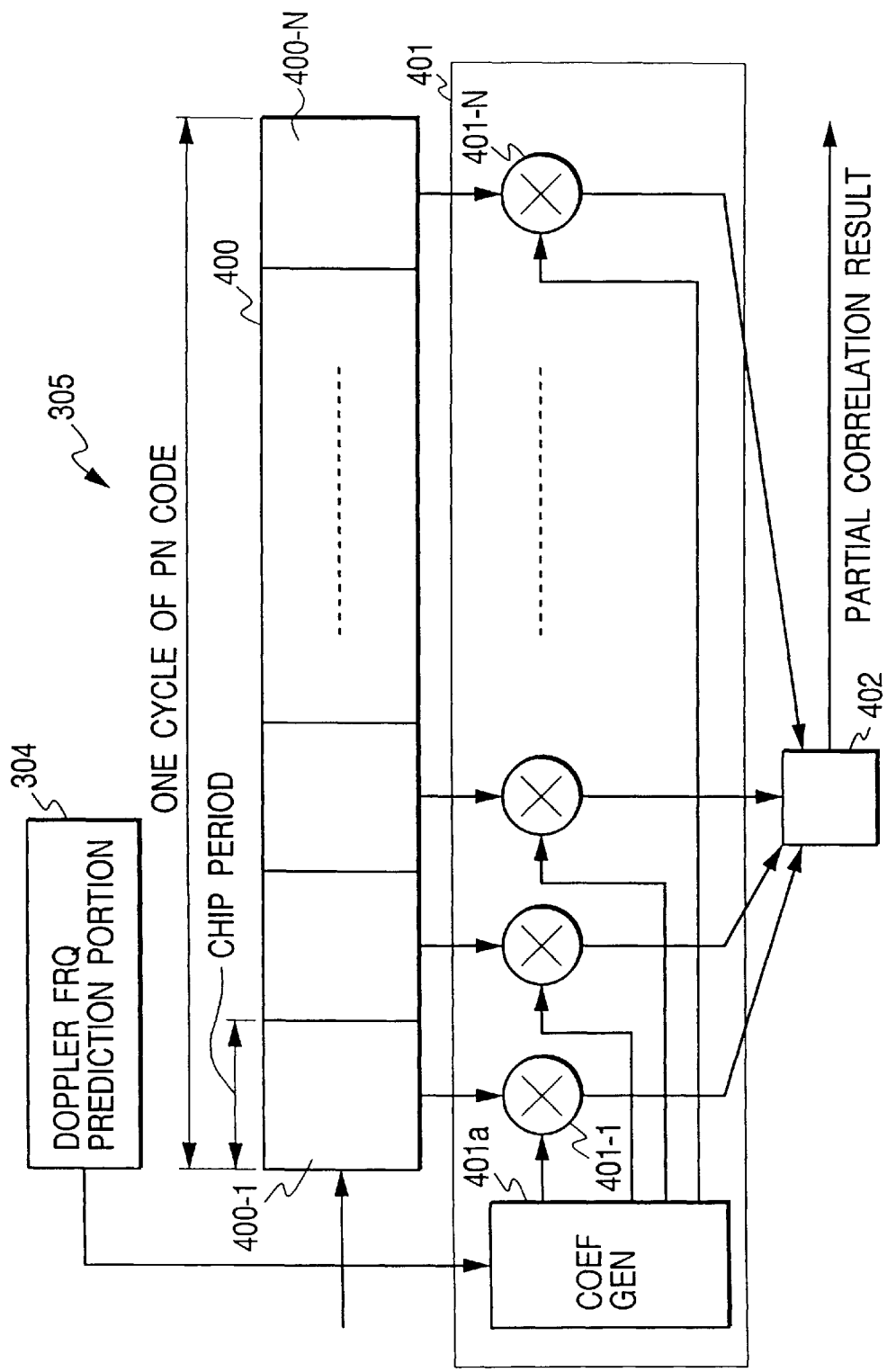
FIG. 4 is a block diagram of a correlation detector and a Doppler frequency prediction portion shown in FIG. 3.

FIG. 4 is a block diagram of the filter 305 and the Doppler frequency prediction portion 304 shown in FIG. 3.

The filter 305 comprises a buffer 400 for storing the correlation result from the correlation detector 300 every chip period by a data length of one cycle of the PN code for the pilot signal, a weighting circuit 401 including a coefficient generator 401a and multipliers 401-1 to 401-N for outputting respective data portions 400-1 to 400-N of the correlation result stored in the buffer 400 respectively weighted in accordance with the predicted Doppler frequency from the Doppler frequency prediction portion 304, and an adder 402 for adding outputs of the multipliers 401-1 to 401-N and outputting the partial correlation result as the phase prediction result.

The Doppler frequency prediction portion 304 has the same structure and operation as that of the first embodiment.

The receiving circuit 11 receives a spread spectrum radio wave signal including spread spectrum data and a spread spectrum pilot signal and converts the received radio wave signal into a base band signal sampled by the a/d converter 11a. The Doppler frequency prediction portion 304 predicts a Doppler frequency from the base band signal. The correlation detector 308 provides the partial correlation result with the length of data of the correlation result changed through the weighting operation. That is, the coefficient generator 401a generates coefficients for multipliers 401-1 to 401-N in accordance with the predicted Doppler frequency. The multipliers 401-1 to 401-N output a partial correlation result. The adder 402 adds the output of the multipliers 401-1 to 401-N to provide a combined partial correlation result.

The PN code generator 303 generates a PN code independently assigned to the receiving apparatus for the CDMA communication. The correlation detector 302 detects the correlation between the base band signal, particularly, the component of the data signal and the PN code for the data signal to provide inverse-spectrum spreading. The fading compensation portion 306 compensates the detected correlation result from the correlation detector 302 in accordance with the combined partial correlation result from the correlation detector 308. The detector 307 detects the received data from an output of the fading compensation portion 306 and outputs the received data.

As mentioned above, according to the second embodiment, the Doppler frequency prediction portion 304 for predicting the Doppler frequency, the filter circuit 305 for providing the partial correlation result through weighting, and a fading compensation portion 306 for compensating the correlation result from the correlation detector 302 are further provided, so that the pilot signal used for a demodulator is more accurately detected and a superior receiving characteristic is provided.

In this embodiment, the filter 305 is of FIR type filter. However, it is also possible to use IIR type filter.

What is claimed is:

1. A receiving apparatus comprising:

a receiving circuit including an antenna for receiving a radio wave signal including a pilot signal and data signal respectively spectrum-spread and converting the received radio wave signal into a base band signal;

Doppler frequency prediction means for predicting a Doppler frequency in said radio wave signal from the base band signal;

correlation detection means including pilot signal PN code generation means for detecting a correlation with respect to said pilot signal in said base band signal every data length of said pilot signal;

correlation length changing means for outputting a portion of said detected correlation with a length of said portion of said detected correlation varied in accordance with said Doppler frequency from said Doppler frequency prediction means; and demodulation means for demodulating said base band signal to detect and output said data signal with a distortion of said data signal compensated in accordance with said portion of said detected correlation.

2. A receiving apparatus comprising:

a receiving circuit including an antenna for receiving a radio wave signal including a pilot signal and data signal respectively spectrum-spread and converting the received radio wave signal into a base band signal;

Doppler frequency prediction means for predicting a Doppler frequency from the base band signal;

correlation detection means including pilot signal PN code generation means for detecting a correlation with respect to the pilot signal in said base band signal every data length of said pilot signal;

filtering means for filtering said detected correlation by weighting said detected correlation in accordance with said Doppler frequency from said Doppler frequency prediction means; and demodulation means for demodulating said base band signal to detect and output said data signal with a distortion of said data signal compensated in accordance with the weighted correlation.

3. A receiving apparatus comprising:

a receiving portion including an antenna for receiving a radio wave signal including a pilot signal and data signal respectively spectrum-spread and converting the received radio wave signal into a base band signal;

Doppler frequency prediction means for predicting a Doppler frequency in said radio wave signal from the base band signal;

first correlation detection means including pilot signal PN code generation means for detecting a correlation between the pilot signal in said base band signal and a pilot signal PN code from said pilot signal PN code generation means every data length of said pilot signal;

correlation length changing means for outputting a portion of said detected correlation with a length of said portion of said detected correlation varied in accordance with said Doppler frequency from said Doppler frequency prediction means;

second correlation detection means including PN code generator for detecting a correlation between PN code included in the data signal and a PN code from said PN code generator;

compensation means for compensating an output of said second correlation detection means in accordance with an output of said correlation length changing means; and detection means for detecting and outputting said data signal from an output of said compensation means.

4. A receiving apparatus comprising:

a receiving portion including an antenna for receiving a radio wave signal including a pilot signal and data signal respectively spectrum-spread and converting the received radio wave signal into a base band signal;

Doppler frequency prediction means for predicting a Doppler frequency from the base band signal;

first correlation detection means including pilot signal PN code generation means for detecting a correlation between the pilot signal in said base band signal and a pilot signal PN code from said pilot signal PN code generation means every data length of said pilot signal;

filtering means for filtering said detected correlation by weighting said detected correlation in accordance with said Doppler frequency from said Doppler frequency prediction means;

second correlation detection means including PN code generator for detecting a correlation between a PN code included in the data signal in said base band signal and a PN code from said PN code generator;

compensation means for compensating an output of said second correlation detection means in accordance with the weighted correlation; and detection means for detecting and outputting said data from an output of said compensation means.

5. A receiving apparatus as claimed in claim 1, wherein said length of said portion of said detected correlation is relatively short when said Doppler frequency from said Doppler frequency prediction means is high and said length of said portion of said detected correlation is relatively long when said Doppler frequency from said Doppler frequency prediction means is low.

6. A receiving apparatus as claimed in claim 2, wherein said detected correlation is weighted in accordance with said Doppler frequency from said Doppler frequency prediction means such that a length of said portion of said detected correlation is made short when said Doppler frequency from said Doppler frequency prediction means is high and said length of said portion of said detected correlation is made relatively long when said Doppler frequency from said Doppler frequency prediction means is low.

7. A receiving apparatus as claimed in claim 3, wherein said length of said portion of said detected correlation is relatively short when said Doppler frequency from said Doppler frequency prediction means is high and said length of said portion of said detected correlation is relatively long when said Doppler frequency from said Doppler frequency prediction means is low.

8. A receiving apparatus as claimed in claim 4, wherein said detected correlation weighted in accordance with said Doppler frequency from said Doppler frequency prediction means such that a length of said portion of said detected correlation is made relatively short when said Doppler frequency from said Doppler frequency prediction means is high and said length of said portion of said detected correlation is made relatively long when said Doppler frequency from said Doppler frequency prediction means is low.

* * * * *